Figure 1:
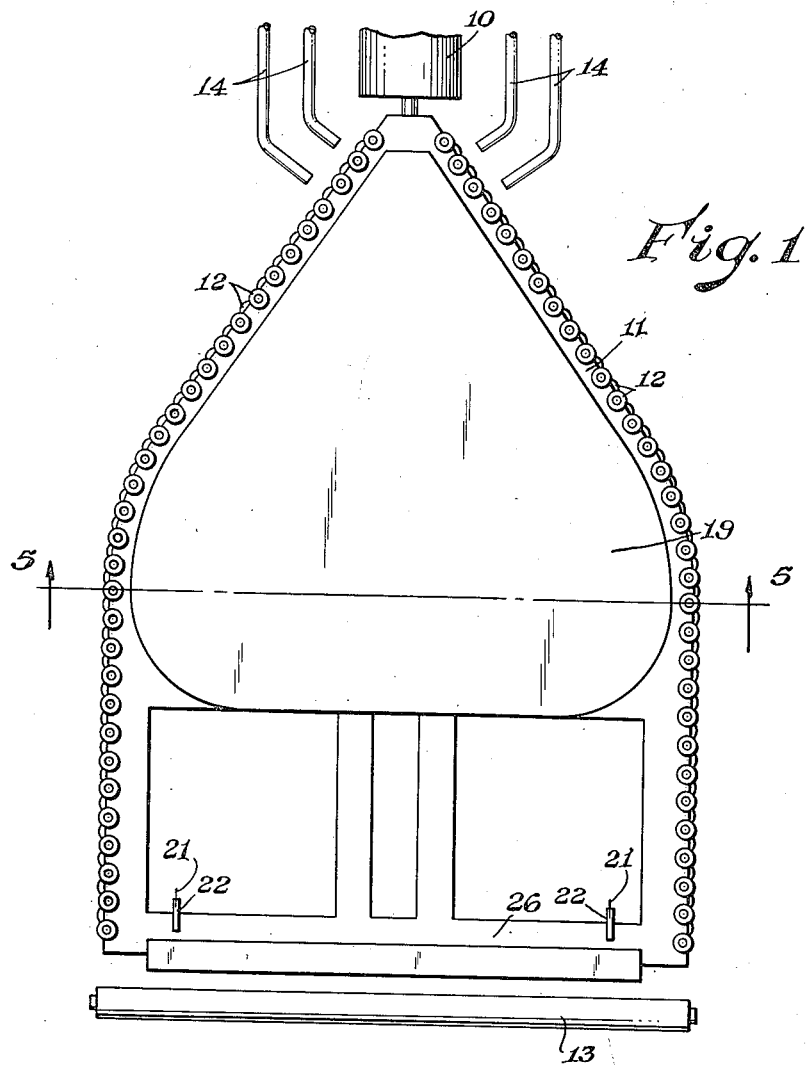

Nov. 13, 1956 M. O. LONGSTRETH ET AL 2,770,007
FILM STRETCHING DEVICE
Filed Dec. 22, 1952 2 Sheets-Sheet 1

INVENTORS.
Murrey O. Longstreth
Daniel W. Ryan
BY
Griswold & Burdick
ATTORNEYS

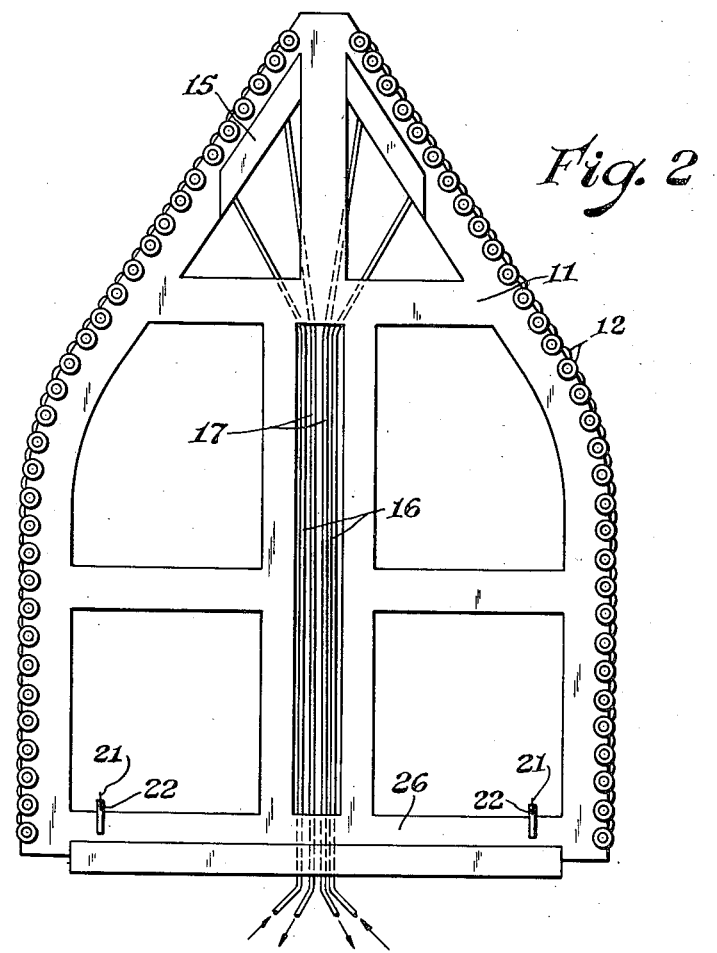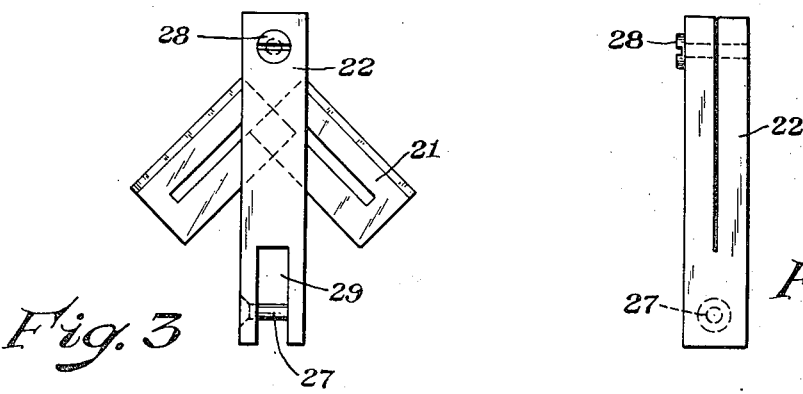

United States Patent Office 2,770,007
Patented Nov. 13, 1956

2,770,007

FILM STRETCHING DEVICE

Murrey O. Longstreth and Daniel W. Ryan, Midland, Mich., assignors to The Dow Chemical Company, Midland, Mich., a corporation of Delaware Application December 22, 1952, Serial No. 327,362

1 Claim. (Cl. 18—1)

This invention relates to an improved device for the stretching or orienting of foils and film.

Films and foils made of certain thermoplastic polymers are highly useful. For example, as described in U. S. Patent 2,074,285, the films made from polystyrene are very valuable as an insulating tape for wrapping electrical cables. Unplasticized polystyrene in its usual state is very brittle, but it is known that when the molecules of polystyrene are arranged or oriented in a certain manner in thin films, the films are flexible and can be readily wound around cables and the like. To accomplish this orientation it is necessary to stretch the material biaxially during production of the film. Various devices have been made for attaining the desired orientation. One of these has been reported by H. Horn in Kunststoffe, 30, pg. 53, (1940). In the method described by Horn, a polystyrene tube is expressed through a circular die and over a divergent spreader mandrel which is attached to the core of the die. The spreader mandrel has a plurality of parallel rollers along its periphery to aid in minimizing the friction between the mandrel and the sliding film. A pair of rolls is located beyond the mandrel and perpendicular to the direction of travel of the film. By operating these rolls at a peripheral speed greater than the speed of the plastic through the die, a simultaneous longitudinal stretch combined with the transverse stretch applied by the mandrel provides the proper biaxial orientation of the polystyrene molecules to attain the desired flexible film. However, when it is attempted to make wide sheets of thin film (1 mil or less), many difficulties are encountered which cause tears or breaks in the film, cause a non-uniform gauge in the film, or otherwise hinder production.

When it is desired to produce flat sheets of film from extruded film tube, it is necessary to slit the tube. It is common practice for the cutting devices to be rigidly mounted independently of the spreader mandrel. In such cases any vibration or other movement of the mandrel relative to the independently mounted cutters produces a film with a ragged or otherwise undesirable edge. Also, the width of a sheet of film trimmed in such a manner varies when the mandrel and the supports for the cutter blades oscillate in opposite directions.

It is an object of this invention to provide an improved device for slitting a tube of film into flat sheets with straight, even edges.

The object of this invention is accomplished by means of sharp edged cutting devices, such as razor blades, held in brackets which are rigidly affixed to the spreader mandrel.

It should be understood that the apparatus of the invention is not limited to the orientation of polystyrene, but that any material capable of being formed into a stretchable film may be employed.

Figure 5:
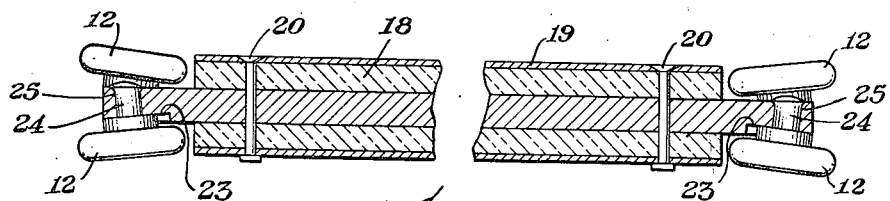

The assembly and operation of the machine will be better understood by reference to the drawings and the following description which represent a preferred embodiment of the invention. In the drawings:

Fig. 1 represents a vertical view of the machine;
Fig. 2 represents a vertical view of the spreader mandrel with the insulating layers removed;
Fig. 3 represents a side of the blade bracket;
Fig. 4 represents a front view of the blade bracket; and
Fig. 5 is a cross-section of the spreader mandrel along line 5—5 of Figure 1.

The machine of which this invention is an improved modification consists of a means for expressing a thermoplastic material through a circular die 10, or other means of supplying an unoriented tubular film, and a divergent spreader mandrel 11 aligned with and attached to the core of the die 10. When so attached, spreader mandrel 11 will be completely within the tube of material. By divergent is meant straight or convex outer edges spreading out symmetrically from the end at which the film is fed onto the spreader mandrel. Concave edges do not give the desired results.

Disposed along the outer edges and on both sides of the mandrel 11 from a point near die 10 are freely rotating, rollers 12 which facilitate conveying the tube past the outer edges of the mandrel 11 without frictional drag. It is preferred that the rollers 12 on one face of the mandrel 11 be in staggered relationship to the rollers 12 on the other face of the mandrel 11. It is also preferred to have the rollers 12 inclined at an angle to the plane of mandrel 11 as described in our concurrently filed application, Serial No. 327,361, now Patent No. 2,695,420. In that method the mounting of the rollers consists of cutting niches 23 along the sides and near the outer edge of mandrel 11. Stub shafts 24 are inserted into holes 25 drilled perpendicularly into the face of the niche 23 nearest the outer edge of mandrel 11. Stub shafts 24 are rigidly held in place by upsetting one end. The rollers 12 are then mounted on stub shafts 24 so as to be freely rotating.

A pair of driven rolls 13 is located beyond the spreader mandrel 11 and extends the width of the mandrel 11, in position to engage the stretched and flattened tube. By operating the rolls 13 at a peripheral speed greater than the speed at which the polymer is being extruded, the rolls provide a longitudinal stretch to the film at the same time as the radial stretch imparted by the mandrel 11.

It is preferred to cool the hot film issuing from the die 10 at the points where the film will contact the rollers 12 to prevent it from sticking thereto. A suitable means for cooling the film is a plurality of air jets 14 mounted a short distance away from and in the plane of spreader mandrell 11, so that air streams may be directed at the tube of polymer as it moves over the edge of the mandrel 11. To supplement the cooling effects of the air jets 14, it is preferred to provide a water-jacketed mandrel. An especially suitable form of such a mandrel is described in our concurrently filed application, Serial No. 327,363, now Patent No. 2,697,248. In this preferred embodiment water jackets 15 are installed in the edges of the mandrel 11 nearest die 10. Water intake 16 and outlet 17 tubes are connected to jackets 15 so that continuous circulation of a heat transfer liquid is possible.

Since it is desired to cool the film only at the edges of mandrel 11, it is necessary to insulate the other parts of mandrel 11. A suitable means of accomplishing this insulation is described in our concurrently filed application Serial No. 327,363, now Patent No. 2,697,248. In the embodiment described in that application, a layer 18 of insulating material, such as glass wool, covers mandrel 11 at least as low as the lower edge of the water jacket 15, and as wide the the distance between the rollers 12. A sheet 19 of stainless steel or other suitable material, which may be held in place with bolts 20, holds the insulating material in position.

The improved trimming devices of this invention are preferably mounted on a crossbar 26 of spreader mandrel 11 at a point beyond the diverging section of mandrel 11. A bracket 22 is affixed to the crossbar 26 by means of a groove 29 fitting over the upper edge of crossbar 26. The bracket 22 is held rigidly in place by means of a bolt 27 through the grooved portion of the bracket 22 and also through the crossbar 26. The razor blades 21 or other cutting means are inserted into a slit cut into the opposite end of the bracket 22 from the groove 29. The blades 21 are held in position by a bolt or set screw 28. When mounted in this manner the blades 21 will be perpendicular to the plane of the mandrel 11.

In operation, a thermoplastic material, such as polystyrene, is expressed through a die 10 so as to form a tube of hot stretchable material. The tube then moves downward and over the spreader mandrel 11 which causes the tube to be transversely stretched. At the point where the tube comes into contact with the mandrel 11, an externally mounted air jet 14 directs a stream of air over that part of the tube which will contact the edges of the mandrel 11. This part of the film is cooled further by conduction from the cooling jackets 15. It is important that only the edges be cooled, otherwise a non-uniform gauge film will result. The film moves over the edges of the mandrel 11 on freely-rotating rollers 12 which minimize the friction of the film sliding over the edges. The film is stretched longitudinally by a pair of driven rolls 13 extending across the width of the mandrel 11. The tube is slit by razor blades 21 so that two flat sheets are obtained.

It is necessary that the tube of film be slit after the lateral stretching has been accomplished.

It is also preferred that the slitting operation occur after the major amount of longitudinal stretch has been applied. By cutting the tube at this point, the film will not relax causing uneven edges. When the cutting devices are mounted as described, the blades or other slitting means will move with the mandrel and remain in the same position relative to the film. In this way flat sheets of film with straight even edges and of constant width will be formed.

We claim:

In an apparatus for stretching previously unoriented tubular film both laterally and longitudinally comprising a spreader mandrel having two parallel plane sides lying between outer edges which diverge symmetrically from the end at which film is fed to said mandrel, of a length, and disposed with said outer edges at an angle, to provide the desired radial stretch to tubular film advanced thereover; freely rotating film-engaging rollers disposed along the outer edges and on both sides of the mandrel; and means for applying a longitudinal stretch to the film; the combination with said mandrel, at a point beyond that at which tubular film formed thereover attains its maximum radial stretch, of film-slitting means rigidly affixed to each edge of each of said plane sides of the mandrel and within the film tube and close to said rollers and disposed so as to maintain longitudinal cutting engagement with film drawn over the mandrel.

References Cited in the file of this patent

UNITED STATES PATENTS 2,361,369     Grebe et al. _____ Oct. 31, 1944

FOREIGN PATENTS 431,619     Great Britain _____ July 11, 1935